United States Patent
Otsubo et al.

(10) Patent No.: US 9,043,044 B2
(45) Date of Patent: *May 26, 2015

(54) SYSTEM AND METHOD FOR COMMUNICATING DATA IN A CONSIST

(71) Applicant: Electro-Motive Diesel, Inc., LaGrange, IL (US)

(72) Inventors: Tom Otsubo, Oak Grove, MO (US); Lawrence Stanley Przybylski, Lemont, IL (US)

(73) Assignee: Electro-Motive Diesel, Inc., LaGrange, IL (US)

(*) Notice: Subject to any disclaimer, the term of this patent is extended or adjusted under 35 U.S.C. 154(b) by 167 days.

This patent is subject to a terminal disclaimer.

(21) Appl. No.: 13/711,117

(22) Filed: Dec. 11, 2012

(65) Prior Publication Data

US 2014/0163769 A1    Jun. 12, 2014

(51) Int. Cl.
| | |
|---|---|
| *G06F 17/00* | (2006.01) |
| *B61L 3/00* | (2006.01) |
| *H04B 7/15* | (2006.01) |
| *H04B 1/38* | (2006.01) |
| *B61C 17/12* | (2006.01) |
| *B61L 15/00* | (2006.01) |
| *B60T 17/22* | (2006.01) |
| *H04L 12/40* | (2006.01) |
| *H04L 12/773* | (2013.01) |
| *H04L 12/703* | (2013.01) |

(52) U.S. Cl.
CPC ............... *B61C 17/12* (2013.01); *G06F 17/00* (2013.01); *B61L 15/0036* (2013.01); *B60T 17/228* (2013.01); *H04L 12/40169* (2013.01); *H04L 45/60* (2013.01); *B60T 2270/406* (2013.01); *B61L 15/0072* (2013.01); *H04L 45/28* (2013.01)

(58) Field of Classification Search
CPC . G06F 17/00; B60T 17/228; B60T 2270/406; B61C 17/12; B61L 15/0036; B61L 15/0072; H04L 12/40169; H04L 45/60; H04L 45/28
USPC ............. 701/1, 19, 20; 246/186, 187, 187 R; 455/11.1; 375/219
See application file for complete search history.

(56) References Cited

U.S. PATENT DOCUMENTS

| | | | |
|---|---|---|---|
| 3,696,758 A | 10/1972 | Godinez, Jr. | |
| 4,042,810 A | 8/1977 | Mosher | |
| 4,105,900 A * | 8/1978 | Martin et al. | 327/526 |
| 4,181,943 A | 1/1980 | Mercer, Sr. et al. | |
| 4,401,035 A | 8/1983 | Spigarelli et al. | |
| 5,600,672 A * | 2/1997 | Oshima et al. | 375/219 |

(Continued)

*Primary Examiner* — Fadey Jabr
*Assistant Examiner* — Angelina Shudy
(74) *Attorney, Agent, or Firm* — Finnegan, Henderson, Farabow, Garrett & Dunner, LLP

(57) ABSTRACT

A system for communicating a dataset may include at least a first and a second communication line. The system may also include a first transceiver configured to communicate a first data signal indicative of the dataset over the first communication line and a second transceiver configured to communicate a second data signal indicative of the dataset over the second communication line. The system may also include a processor. The processor may be configured to receive the first data signal and the second data signal and compare the first data signal and the second data signal to determine whether the first data signal or the second data signal comprises a more accurate signal. The processor may also be configured to determine the dataset based upon the more accurate signal.

14 Claims, 4 Drawing Sheets

(56) References Cited

U.S. PATENT DOCUMENTS

| | | | |
|---|---|---|---|
| 5,767,738 A * | 6/1998 | Brown et al. | 329/304 |
| 5,878,352 A * | 3/1999 | Souissi et al. | 455/503 |
| 5,969,643 A | 10/1999 | Curtis | |
| 6,658,050 B1 * | 12/2003 | Ramesh et al. | 375/219 |
| 6,862,502 B2 * | 3/2005 | Peltz et al. | 701/19 |
| 7,021,589 B2 | 4/2006 | Hess, Jr. et al. | |
| 7,072,747 B2 | 7/2006 | Armbruster et al. | |
| 7,073,753 B2 | 7/2006 | Root et al. | |
| 7,263,475 B2 | 8/2007 | Hawthorne et al. | |
| 7,548,032 B2 | 6/2009 | Alton, Jr. et al. | |
| 7,702,054 B2 * | 4/2010 | Rai et al. | 375/355 |
| 7,894,541 B2 * | 2/2011 | Oshima | 375/261 |
| 7,949,441 B2 | 5/2011 | Baig et al. | |
| 8,422,590 B2 * | 4/2013 | Leibowitz et al. | 375/316 |
| 8,594,159 B2 * | 11/2013 | Sekino | 375/219 |
| 8,700,237 B1 * | 4/2014 | Przybylski et al. | 701/19 |
| 8,805,298 B2 * | 8/2014 | McCallister | 455/78 |
| 2001/0043648 A1 * | 11/2001 | Ducaroir et al. | 375/224 |
| 2005/0121971 A1 | 6/2005 | Ring | |
| 2008/0243320 A1 * | 10/2008 | Otsubo et al. | 701/19 |
| 2011/0170577 A1 * | 7/2011 | Anvari | 375/219 |
| 2011/0270475 A1 | 11/2011 | Brand et al. | |
| 2011/0282525 A1 | 11/2011 | Kraeling et al. | |
| 2012/0232726 A1 * | 9/2012 | Nandedkar et al. | 701/19 |
| 2012/0287974 A1 * | 11/2012 | Muralidhar et al. | 375/219 |
| 2013/0022091 A1 * | 1/2013 | Muralidhar et al. | 375/219 |
| 2013/0215933 A1 * | 8/2013 | Young et al. | 375/145 |
| 2013/0261856 A1 * | 10/2013 | Sharma et al. | 701/19 |
| 2014/0114508 A1 * | 4/2014 | Przybylski | 701/19 |
| 2014/0156119 A1 * | 6/2014 | Wiemeyer et al. | 701/19 |
| 2014/0156120 A1 * | 6/2014 | Deitz et al. | 701/19 |
| 2014/0162562 A1 * | 6/2014 | Przybylski et al. | 455/66.1 |

* cited by examiner

SYSTEM AND METHOD FOR COMMUNICATING DATA IN A CONSIST

TECHNICAL FIELD

This disclosure relates generally to a data communication network and, more specifically, to a system and method for communicating data in a consist using redundant communication lines.

BACKGROUND

Transmitting data in a consist may allow control systems to monitor and coordinate systems of a locomotive and/or consist, such as brakes, speed, and power. Traditionally, data may be transmitted by various cabling techniques between the railcars making up the consist. Because there is a gap between railcars, the cabling may be exposed to the weather and may be susceptible to the turning, twisting, and pulling of the railcars. As a result of such conditions, communication cables may be prone to failures that prevent the transmission of data. Data transmission failure may cause numerous problems or delay the operation of the consist.

One system for communicating data in a consist is described in U.S. Patent Application Publication No. 2011/0282525 ("the '525 publication"). The '525 publication is directed to a communication system for a vehicle consist including a control module that interfaces with at least one of a first router transceiver pair or a redundant router transceiver pair. Each of the router transceiver pairs of the '525 publication may communicate network data between vehicles of the consist over a cable bus of the vehicle consist. The control module may include a monitor module to monitor operation of at least one of the first router transceiver pair or the redundant router transceiver pair. The control module may also include a switch module operably coupled to the monitor module to control the first router transceiver pair or the redundant router transceiver pair to communicate the network data over the cable bus if the other of the first transceiver pair or the redundant router transceiver pair enters a failure condition for being unable to communicate the network data over the cable bus.

The system provided by the '525 publication may suffer from a number of possible drawbacks. For example, the '525 publication may only provide a system for redundantly transmitting data, but does not provide a system for repairing erroneous, corrupted, or incomplete data. Furthermore, redundant transmissions such as those disclosed in the '525 publication may require high bandwidth capacity. Often, large transmissions such as video data may exceed the bandwidth capacity, which may prevent transmission of data critical to the operation of the consist.

The presently disclosed systems and methods are directed to overcoming and/or mitigating one or more of the drawbacks set forth above and/or other problems in the art.

SUMMARY

According to one aspect, this disclosure is directed to a system for communicating a dataset. The system may include at least a first and a second communication line. The system may also include a first transceiver configured to communicate a first data signal indicative of the dataset over the first communication line and a second transceiver configured to communicate a second data signal indicative of the dataset over the second communication line. The system may also include a processor. The processor may be configured to receive the first data signal and the second data signal and compare the first data signal and the second data signal to determine whether the first data signal or the second data signal comprises a more accurate signal. The processor may also be configured to determine the dataset based upon the more accurate signal.

In accordance with another aspect, this disclosure is directed to a computer-implemented method. The method may include receiving a first data signal indicative of a dataset from a first transceiver of a first transceiver set along a first communication line and a second data signal indicative of the dataset from a second transceiver of the first transceiver set along a second communication line. The method may include comparing the first data signal to the second data signal to determine whether the first data signal or the second data signal comprises a more accurate signal. The method may also include determining the dataset based upon the more accurate signal.

According to another aspect, this disclosure is directed to a consist. The consist may include a plurality of railcars. The consist may also include at least one brake sensor associated with at least one of the plurality of railcars and configured to provide signals indicative of brake pressure associated with the consist and at least one speed sensor associated with at least one of the plurality of railcars and configured to provide signals indicative of speed associated with the consist. The consist may also include a system for communicating a dataset. The system may include at least a first and a second communication line. The system may also include a first transceiver configured to communicate a first data signal indicative of the dataset over the first communication line and a second transceiver configured to communicate a second data signal indicative of the dataset over the second communication line. The system may also include a processor. The processor may be configured to receive the first data signal and the second data signal and compare the first data signal and the second data signal to determine whether the first data signal or the second data signal comprises a more accurate signal. The processor may also be configured to determine the dataset based upon the more accurate signal.

DETAILED DESCRIPTION

Figure 1:
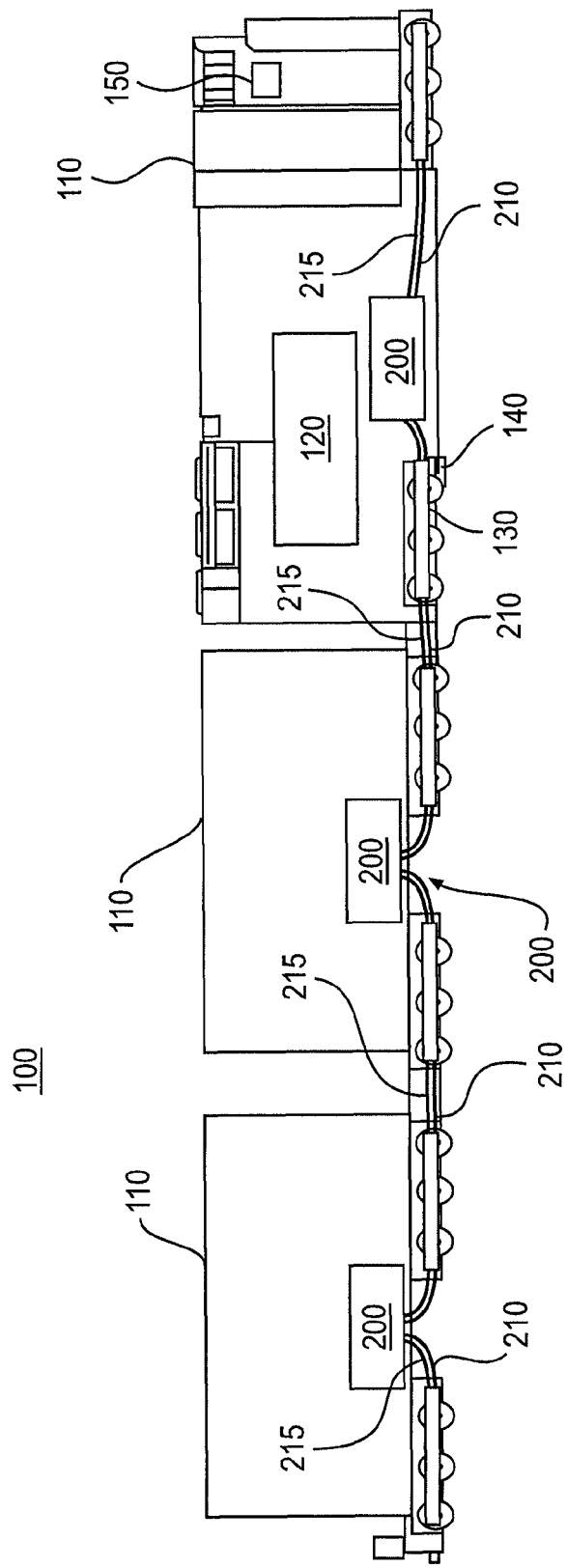
FIG. 1 is a side view of an exemplary embodiment of a consist.

FIG. 1 shows an exemplary consist 100 in which systems and methods for communicating data may be implemented consistent with the disclosed exemplary embodiments. Consist 100 may include one or more railcars 110. Optionally, one or more of railcars 110 may include an engine 120. According to the exemplary embodiment illustrated in FIG. 1, consist 100 may additionally include brakes 130, a brake sensor 140 configured to measure brake pressure, and a speed sensor 150 configured to measure the speed of consist 100. Consist 100 may include a system 200 for communicating data within consist 100. System 200 may include a first communication line 210 and a second communication line 215.

Figure 2:
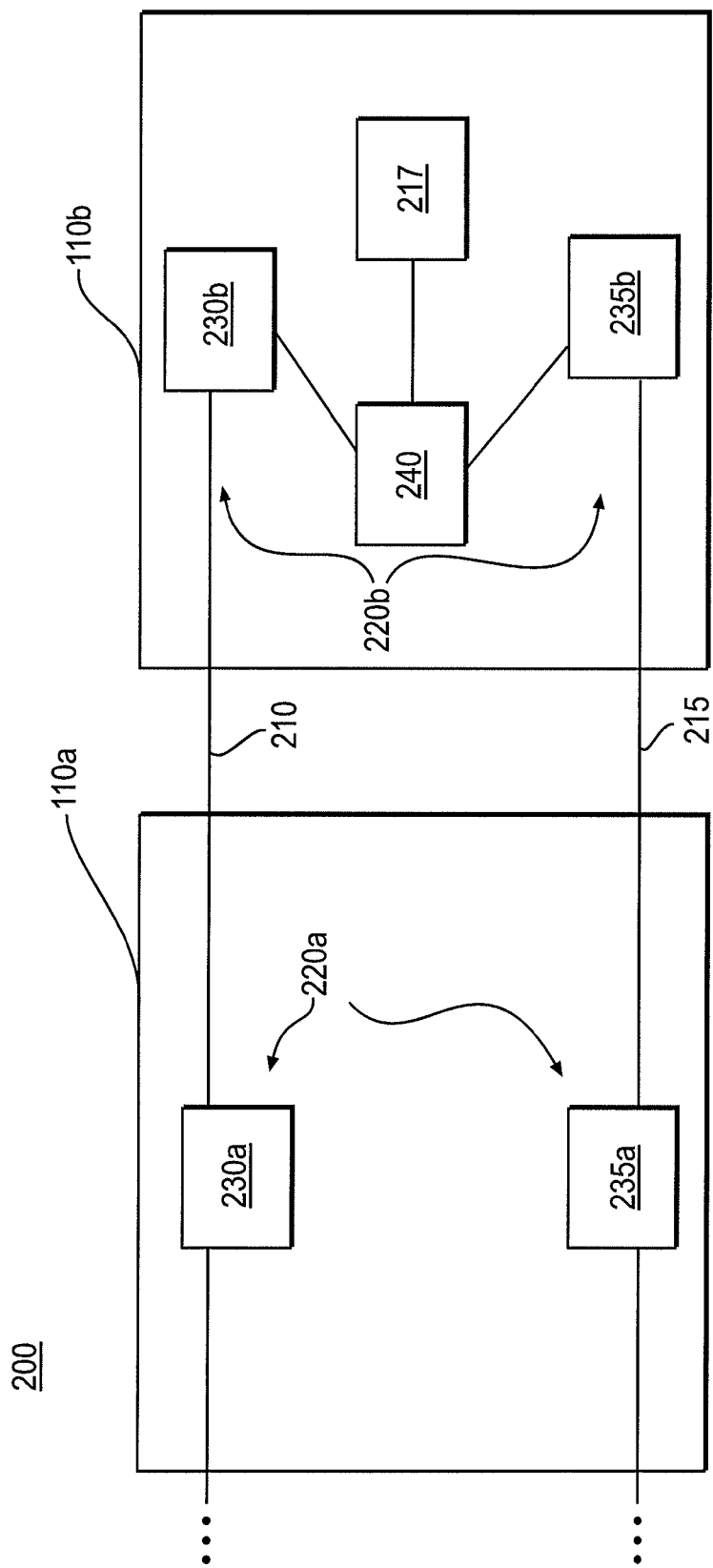
FIG. 2 is a schematic diagram of an exemplary embodiment of a system for communicating data in a consist.

FIG. 2 shows an exemplary embodiment of system 200 for communicating a dataset within consist 100. First communication line 210 and second communication line 215 may be used to transmit signals indicative of the dataset between two or more railcars 110. According to some embodiments, communication lines 210 and 215 may be implemented with one or more of digital subscribing line (DSL), Ethernet, or other similar cabling technology. According to some embodiments, first communication line 210 may use a different type of cabling technology than second communication line 215. According to some embodiments, communication lines 210 and 215 may be used to link one or more subsystems located on different railcars 110. Communication lines 210 and/or 215 may include insulation and/or coating materials wrapped around conductive portions of communication lines 210 and/or 215. According to some embodiments, communication lines 210 and 215 may be used to link subsystems from railcars 110 directly to a locomotive control system 217. Thus, only system 200 located on one or more lead railcars 110 may include locomotive control system 217.

System 200 may further include a first transceiver set 220a and a second transceiver set 220b, and each transceiver set 220a and 220b may be associated with one or more railcars 110. For example, first transceiver set 220a may be located on railcar 110a, and second transceiver set 220b may be located on railcar 110b, as shown in FIG. 2. Each transceiver set 220a and 220b may include at least two transceivers 230. According to some embodiments, transceiver set 220a may include a first transceiver 230a and a second transceiver 235a, and second transceiver set 220b may include a first transceiver 230b and a second transceiver 235b. First transceivers 230a and 230b may be configured to transmit and/or receive signals along first communication line 210. Second transceivers 235a and 235b may be configured to transmit and/or receive signals along second communication line 215.

Each transceiver 230a and 235a of first transceiver set 220a may be configured to send and/or receive signals indicative of the same dataset. Thus, during normal operation, the dataset indicated by the first signal received by 230a should be the substantially the same as the data indicated by the second signal received by second transceiver 235a. For example, if both communication lines 210 and 215 use the same cabling technology, the first data signal will be substantially the same as the second data signal. Thus, upon comparison of the first signal and the second signal, errors or missing data may be detected and corrected.

System 200 may include one or more processors 240 (e.g., a microprocessor) for detecting errors in the first and/or second data signals and for repairing the detected errors. According to the embodiment shown in FIG. 2, system 200 may include processor 240 associated with locomotive control system 217. Processor 240 may embody a single processor or multiple processors that includes a means for detecting errors in the data, repairing the detected errors, and communicating with one or more of transceivers 230a, 230b, 235a, and 235b. Additionally or alternatively, processor 240 may be a portion or all of locomotive control system 217. Numerous commercially available processors can be configured to perform the functions of processor 240. It should be appreciated that processor 240 could readily embody a general machine or customized processor capable of controlling the operation of system 200. Processor 240 may include all components required to run an application, such as, for example, a memory, a secondary storage device, and a processor, such as a central processing unit or other known means. Various other known circuits may be associated with processor 240, including power source circuitry (not shown) and other appropriate circuitry.

To detect any errors in the first and second data signals, processor 240 may compare the first data signal sent by first transceiver 230a (or 230b) with the second data signal sent by the second transceiver 235a (or 235b). Additionally or alternatively, processor 240 may determine which data signal locomotive control system 217 should rely upon to determine the dataset underlying both data signals. For example, processor 240 may determine that the first data signal is more accurate representation of the dataset based on a comparison of the characteristics of both data signals. According to some embodiments, processor 240 may determine which of the two data signals has a greater signal strength. For example, processor 240 may detect a first signal strength associated with the first data signal and a second signal strength associated with the second data signal. Then, processor 240 may compare first signal strength with second signal strength to determine the more accurate signal. Processor 240 may then disregard the weaker data signal and indicate to locomotive control system 217 that the stronger data signal is indicative of the dataset.

According to some embodiments, after processor 240 compares the signals sent by first transceiver 230a and second transceiver 235a, processor 240 may instruct transceivers 230a and 235a to send the first and second data signals across communications lines 210 and 215, respectively. For example, processor 240 may transmit the repaired first data signal to first transceiver 230a, and a signal to first transceiver 230a to transmit the repaired signal to first transceiver 230b of second transceiver set 220b. According to some embodiments, when no errors are detected, this may include a signal giving permission to first transceiver 230a and second transceiver 235a to transmit the first and second data signals, respectively, that they received. Additionally or alternatively, processor 240 may send the dataset to one or more of transceivers 230a and 235a to transmit signals indicative of this dataset across communication lines 210 and/or 215, respectively.

According to some embodiments, each railcar 110 may include one processor 240. By associating each processor 240 with one or more transceiver sets 220, processor 240 may verify data received by transceivers 230a and/or 230b is repaired after each transmission. In some alternative embodiments, processors 240 may be placed anywhere within consist 100 where it may be desired to verify the accuracy of the transmitted data. For example, processor 240 may be associated with and/or contained in locomotive control system 217. Other embodiments do not include transceiver sets 220 in every railcar 110, but rather in any desired subset configuration of railcars 110.

The dataset transmitted over communication lines 210 and 215 may include both critical data and noncritical data. Critical data may include any data that may be relevant to the basic operation of consist 100, such as brake pressure or speed. Noncritical data may include any other data, such as video recordings, that may not be related to the basic operation of consist 100. According to some embodiments, processor 240 may be configured to isolate the critical data from the noncritical data. Furthermore, system 200 may be configured to transmit critical data redundantly over both first and second communication lines 210 and 215. Additionally or alternatively, system 200 may be configured to transmit noncritical data at a lower priority than the critical data. For example, noncritical data may be transmitted across only one of first and second communication lines 210 and 215, and may be transmitted only after transmission of any critical data.

Figure 3:
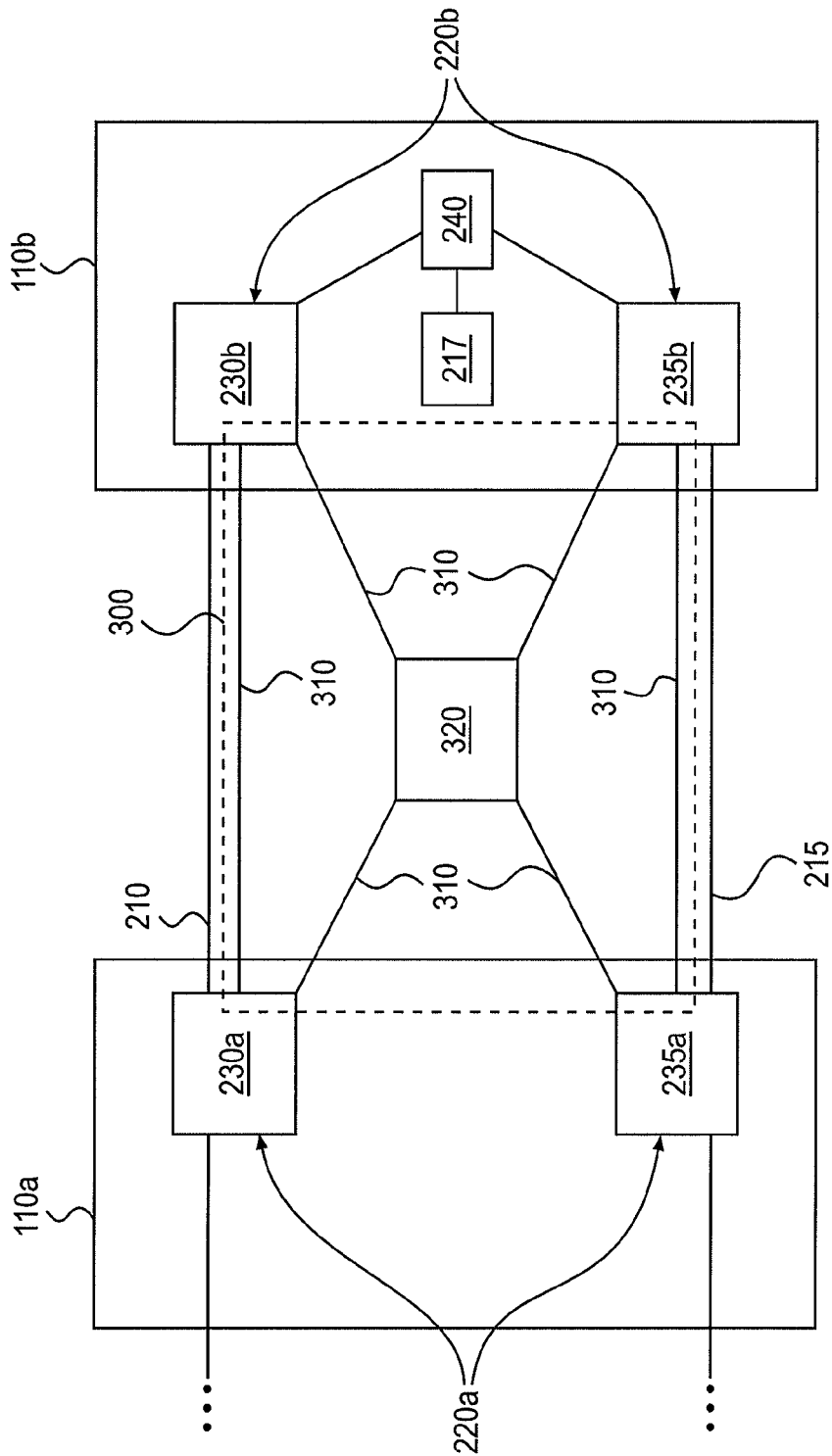
FIG. 3 is a schematic diagram of an exemplary embodiment of a failover system for monitoring the functionality of an embodiment of a communication system.

FIG. 3 shows an exemplary embodiment of a failover system 300 that may optionally be associated with system 200. Failover system 300 may be configured to identify errors in the functionality of transceivers 230a, 230b, 235a, and/or 235b before the transmission of data. Failover system 300 may include a plurality of heartbeat lines 310. Heartbeat lines 310 may be configured to transmit a heartbeat signal from at least one of the first transceivers 230a and 230b. Heartbeat lines 310 may optionally connect transceiver 230a to transceiver 230b and transceiver 235a to transceiver 235b. Each transceiver 230a, 230b, 235a, and 235b may repeatedly output a pulse or a continuous signal, such as a low voltage pulse or signal, called a "heartbeat signal" that may be transmitted along heartbeat lines 310. Failover system 300 may also include a monitoring module 320 configured to monitor the functionality of each transceiver 230a, 230b, 235a, and/or 235b by verifying the existence of a heartbeat signal transmitted by each transceiver.

According to some embodiments, monitoring module 320 may receive a heartbeat signal directly from the particular transceiver that is transmitting the heartbeat signal. Additionally or alternatively, monitoring module 320 may receive a heartbeat signal indirectly by monitoring the heartbeat signal received by a particular transceiver from the corresponding transceiver of another transceiver set. Monitoring module 320 may also be configured to direct data transmissions along communication lines 210 and between transceiver sets 220a and 220b based on the functionality of individual transceivers 230a, 230b, 235a, and/or 235b. If monitoring module 320 does not detect a heartbeat signal from one of transceivers 230a, 230b, 235a, and 235b, it may prevent data from being transmitted to that transceiver. For example, monitoring module 320 may direct transmission of the first data signal to first transceiver 230b only when it determines first transceiver 230b is functioning properly (outputting a heartbeat signal). Likewise, monitoring module 320 may direct transmission of the second data signal to second transceiver 235b only when it determines second transceiver 235b is functioning properly (outputting a heartbeat). Instead, redundant communication lines 210 and/or 215 may be used to ensure a successful transmission of data between transceiver sets 220a and 220b by sending the signals only to the functioning transceivers 230a, 230b, 235a, and/or 235b.

In some embodiments, each transceiver set 220a and 220b has a dedicated monitoring module 320. Additionally or alternatively, each monitoring module 320 may be responsible for monitoring the functionality of components of more than one of transceiver sets 220a and 220b. For example, monitoring module 320 shown in FIG. 3 may be responsible for monitoring all of the transceivers in first transceiver set 220a and second transceiver set 220b. Each monitoring module 320 may verify the heartbeat signal of the next transceivers 230 scheduled to receive the transmitted data and may direct the transmission to only those transceivers 230 within the next transceiver set that are currently displaying a heartbeat.

Figure 4:
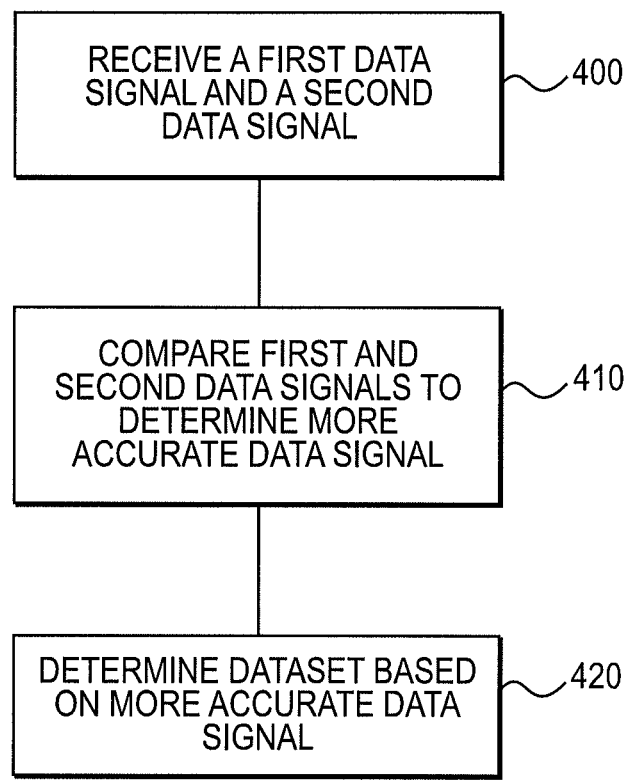
FIG. 4 is a flowchart of an exemplary embodiment of a method for communicating data in a consist.

FIG. 4 is a flow chart representing an exemplary embodiment of a method for communicating data along consist 100. At step 400, processor 240 may receive a first data signal indicative of a dataset to be sent from first transceiver 230a of first transceiver set 220a along first communication line 210 to locomotive control system 217. At step 410, processor 240 may receive a second signal indicative of the dataset to be sent from second transceiver 235a of first transceiver set 220a along second communication line 215 to locomotive control system 217.

At step 420, processor 240 may compare the first data signal to the second data signal to determine which signal may be a more accurate representation of the underlying dataset. This comparison may include detecting any inconsistencies or differences between the two signals, as discussed further with reference to FIG. 2. For example, if any portion of first data signal differs from the respective portion of second data signal, processor 240 may determine an error is present. Additionally or alternatively, this comparison may include comparing the relative signal strength of the two data signals. For example, processor 240 may determine that the signal with the higher signal strength is a more reliable indication of the dataset of both data signals.

INDUSTRIAL APPLICABILITY

The disclosed system and methods may provide a robust solution for communicating data in a consist. The presently disclosed systems and methods may have several advantages. For example, the reliability of data communicated within a consist may be greatly increased because of the redundancy in transmission down multiple communication lines and/or the separation of critical and noncritical data. Isolating critical data and prioritizing its transmission over that of noncritical data may increase the accuracy and efficiency of the communication of data essential to the control systems responsible for the operating procedures of the consist.

Additionally, the disclosed systems and methods may be customized based on the particular characteristics and requirements of the consist. For example, the configuration of processors, transceivers, and monitoring modules may be selected based on the consist length and functions of the railcars within the consist. Also, the number of communication lines and the type of wiring may be selected based on type of consist and the necessity for accurate data transmission.

It will be apparent to those skilled in the art that various modifications and variations may be made to the disclosed systems for communicating data in a consist and associated methods for operating the same. Other embodiments of the present disclosure will be apparent to those skilled in the art from consideration of the specification and practice of the present disclosure. It is intended that the specification and examples be considered as exemplary only, with a true scope of the present disclosure being indicated by the following claims and their equivalents.

What is claimed is:

1. A system comprising:
   at least one brake sensor configured to provide signals indicative of brake pressure;
   at least one speed sensor configured to provide signals indicative of speed;
   at least a first and a second communication line;
   a first transceiver configured to communicate a first data signal indicative of a dataset over the first communication line;
   a second transceiver configured to communicate a second data signal indicative of the dataset over the second communication line; and
   a processor configured to:
      receive the first data signal and the second data signal;
      compare the first data signal with the second data signal to determine whether the first data signal or the second data signal comprises a more accurate signal; and
      determine the dataset based upon the more accurate signal,
   wherein the dataset includes at least one of the signals indicative of the brake pressure and the signals indicative of the speed.

2. The system of claim 1, wherein the processor is further configured to transmit a signal indicative of at least one of the dataset and the identity of the more accurate signal to a locomotive control system.

3. The system of claim 1, wherein the processor is further configured to:
   detect a first signal strength of the first data signal and a second signal strength of the second data signal;
   compare the first and second signal strengths to determine which of the first data signal and the second data signal has a greater signal strength; and
   identify the more accurate signal as the first data signal or second data signal having the greater signal strength.

4. The system of claim 1, wherein the dataset includes critical data and noncritical data, and the processor is further configured to isolate the critical data from the noncritical data.

5. The system of claim 4, wherein the first and second transceivers are further configured to transmit the critical data redundantly over the at least first and second communication lines, and transmit the noncritical data over at least one of the first and second communication lines at a lower priority than the critical data.

6. The system of claim 4, wherein critical data includes at least one of a speed and a brake pressure.

7. The system of claim 1, further including:
   a plurality of heartbeat lines, each heartbeat line configured to transmit a heartbeat signal from one of the first and second transceivers; and
   a monitoring module configured to:
      detect the heartbeat signal from at least one of the first and second transceivers to determine whether the at least one of the first and second transceivers is functioning properly;
      direct transmission of the first data signal to the first transceiver only when the first transceiver is functioning properly; and
      direct transmission of the second data signal to the second transceiver only when the second transceiver is functioning properly.

8. The system of claim 7, wherein the heartbeat signal includes a pulse signal.

9. A consist comprising:
   a plurality of railcars;
   at least one brake sensor associated with at least one of the plurality of railcars and configured to provide signals indicative of brake pressure associated with the consist;
   at least one speed sensor associated with at least one of the plurality of railcars and configured to provide signals indicative of speed associated with the consist; and
   a system for communicating a dataset, the system comprising:
      at least a first and a second communication line;
      a first transceiver configured to communicate a first data signal indicative of the dataset over the first communication line;
      a second transceiver configured to communicate a second data signal indicative of the dataset over the second communication line;
      a processor configured to:
         receive the first data signal and the second data signal;
         compare the first data signal with the second data signal to determine whether the first data signal or the second data signal comprises the more accurate signal; and
         determine the dataset based upon the more accurate signal.

10. The system of claim 9, wherein the processor is further configured to:
   detect a first signal strength of the first data signal and a second signal strength of the second data signal;
   compare the first and second signal strengths to determine which of the first data signal and the second data signal has a greater signal strength; and
   identify the more accurate signal as the first data signal or second data signal having the greater signal strength.

11. The consist of claim 10, wherein the dataset includes critical data and noncritical data, and the processor is further configured to isolate the critical data from the noncritical data.

12. The consist of claim 11, wherein the first and second transceivers are further configured to transmit the critical data redundantly over the at least first and second communication lines, and transmit the noncritical data over at least one of the first and second communication lines at a lower priority than the critical data.

13. The consist of claim 12, wherein the critical data includes at least one of the brake pressure and the speed associated with the consist.

14. The consist of claim 9, further including:
   a plurality of heartbeat lines, each heartbeat line configured to transmit a heartbeat signal from one of the first and second transceivers; and
   a monitoring module configured to:
      detect the heartbeat signals to determine whether the transceivers are functioning properly;
      direct transmission of the first data signal only if the first transceiver is operating properly; and
      direct transmission of the second data signal only if the second transceiver is operating properly.

* * * * *